(12) United States Patent
Cocks (10) Patent No.: US 9,470,364 B2
(45) Date of Patent: Oct. 18, 2016

(54) GUARD SYSTEM FOR PUMP ASSEMBLY

(71) Applicant: William Cocks, Washougal, WA (US)

(72) Inventor: William Cocks, Washougal, WA (US)

( * ) Notice: Subject to any disclaimer, the term of this patent is extended or adjusted under 35 U.S.C. 154(b) by 539 days.

(21) Appl. No.: 13/864,820

(22) Filed: Apr. 17, 2013

(65) Prior Publication Data

US 2014/0311283 A1    Oct. 23, 2014

(51) Int. Cl.
*F16P 1/02*    (2006.01)

(52) U.S. Cl.
CPC .................. *F16P 1/02* (2013.01); *Y10T 74/219* (2015.01)

(58) Field of Classification Search
CPC ......... F16D 3/843; Y10T 74/219; F16P 1/02
USPC ...... 74/609; 248/124.1; 285/149.1; 464/172, 464/176
See application file for complete search history.

(56) References Cited

U.S. PATENT DOCUMENTS

| | | | |
|---|---|---|---|
| 2,469,531 A * | 5/1949 | Toth et al. ...................... 82/152 |
| 3,824,890 A * | 7/1974 | Zettler et al. ................. 409/134 |
| 4,290,717 A * | 9/1981 | Aslen ........................ 408/241 G |
| 4,324,533 A * | 4/1982 | Schroeder et al. ........... 417/360 |
| 6,190,261 B1 | 2/2001 | Powell |
| 6,241,618 B1 * | 6/2001 | Doll .............................. 464/176 |
| 7,275,995 B2 * | 10/2007 | Doll .............................. 464/176 |
| 7,520,816 B1 * | 4/2009 | Brisk ............................ 464/172 |
| 8,025,577 B2 * | 9/2011 | LaBarge, III ................. 464/172 |

FOREIGN PATENT DOCUMENTS

GB                574285          * 12/1945     .................... 74/609

OTHER PUBLICATIONS

Grease Fitting, wikipedia.org, Feb. 13, 2015.*

* cited by examiner

*Primary Examiner* — Vinh Luong
(74) *Attorney, Agent, or Firm* — Mark S Hubert (57) ABSTRACT

A length adjustable guard system for shielding the driveshaft and coupling joint directly abuts the motor housing at one end and is secured at a second end to the pump housing. Interchangeable mounting plates allow the guard assembly to attach to various pumps. The guard system is lightweight, easily installed by one individual, and incorporates vent ports and inspection ports, allowing a worker to grease motor and pump bearings without removing the guard system. Flexible finger guards further secure the motor and pump assembly as they are designed to matingly conform to recesses about the pump housing.

5 Claims, 10 Drawing Sheets

GUARD SYSTEM FOR PUMP ASSEMBLY

BACKGROUND OF THE INVENTION

Providing a safe environment is important in any industrial setting. A healthy, happy workforce is a company's most prized asset. Accordingly, companies look to not only meet OHSA standards but also exceed them. Rotating parts on industrial pumps, for example, pose serious safety concerns, for those using and maintaining the pumps. The coupling, or drive shaft of the pump system, is often encased in a removable housing, to protect workers from the spinning parts. However, often this housing is heavy, requiring at least two workers for installation, often has no inspection ports, commonly has area of exposure, and does not allow for maintenance of the motor or pump without first removing the guard. A new guard system will allow employers to create a safe work environment while minimizing the lockout time required for maintenance, and hence increases the efficiency of the equipment in question.

SUMMARY OF THE INVENTION

In accordance with the invention, the guard system for a pump assembly is lightweight, adjustable in length, incorporates vent ports and inspection ports, and allows a worker to grease motor and pump bearings without guard removal. The guard system is lightweight, and easily installed by a single individual. Additionally, interchangeable attachment plates allow the guard system to be installed on a plethora of pump designs, and flexible finger guards employ a z-shaped compression flange at both ends, and are designed to matingly conform to recesses about the pump housing, further securing the pump and motor assembly.

DETAILED DESCRIPTION

Figure 1:
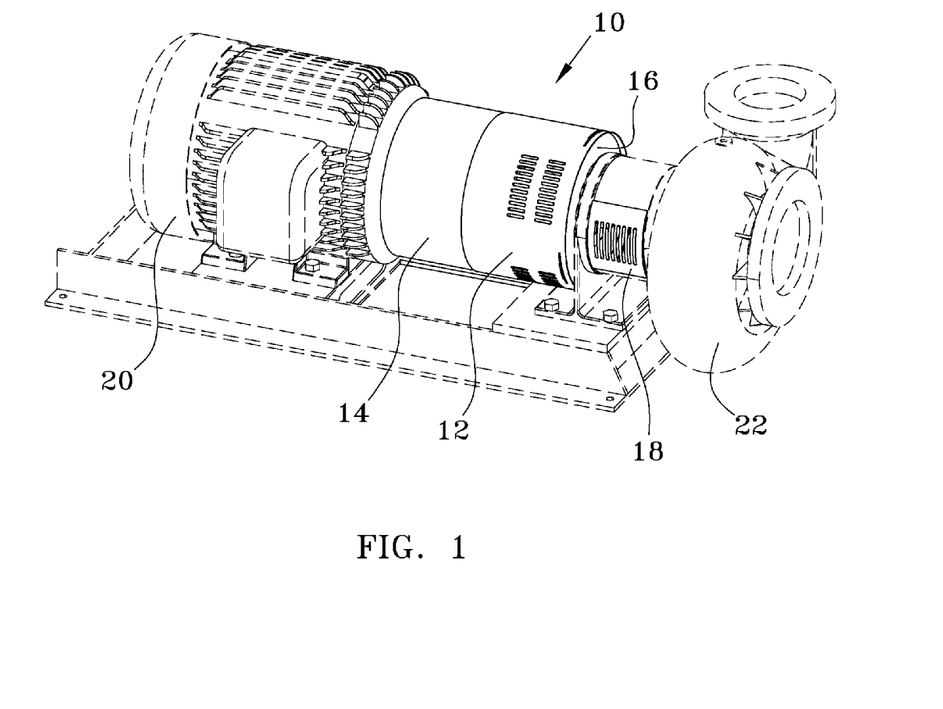
FIG. 1 is a perspective view of the guard system of the present invention installed on a pump.

Looking at FIG. 1 the guard system, made of a guard assembly 10 and a finger guard 18 can be seen installed on a pump. Guard assembly 10 comprises a guard 12, guard extension 14, and mounting plate 16. Guard assembly 10 encloses a driveshaft (not illustrated) that couples rotational movement of the motor 20 to the fluid pump 22. Since the driveshaft is spinning very quickly, it is a serious safety issue for workers, engaging in work on and around the pump.

Figures 2, 3:
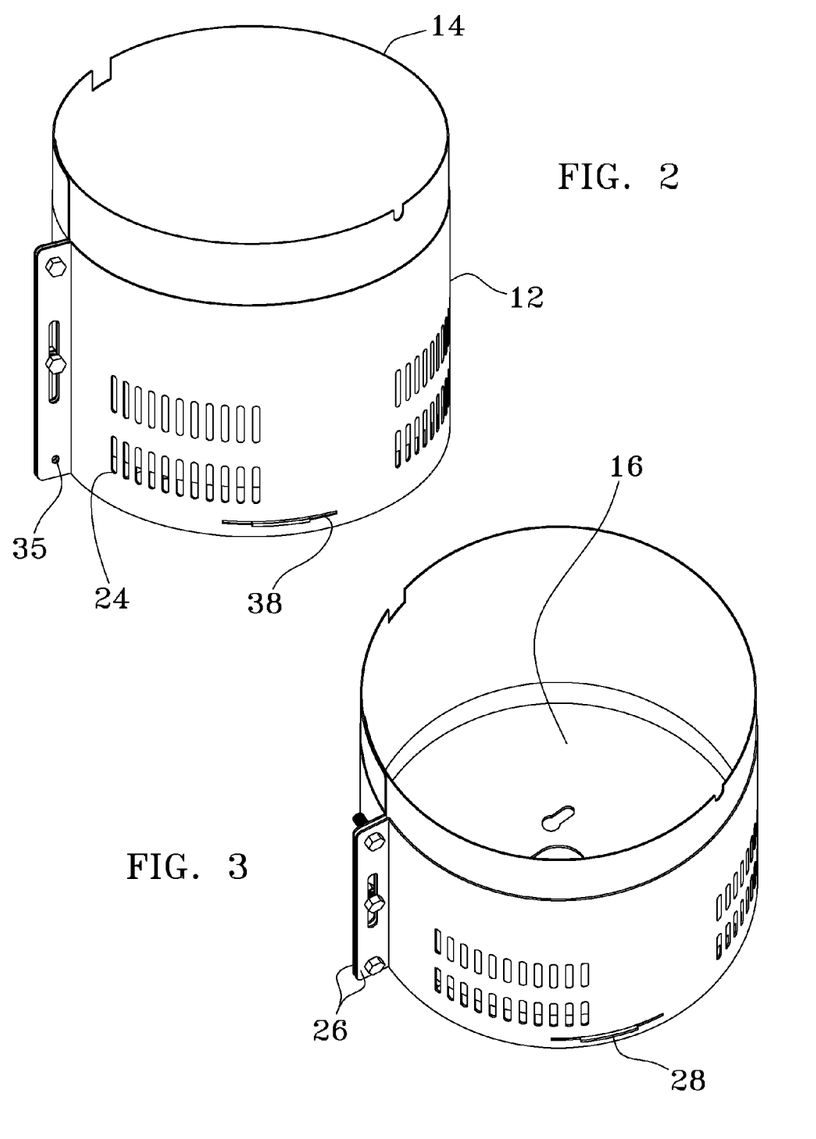
FIG. 2 is a first perspective view of the guard and guard extension coupled together.
FIG. 3 is a second perspective view of the guard and guard extension coupled together.
Figure 4:
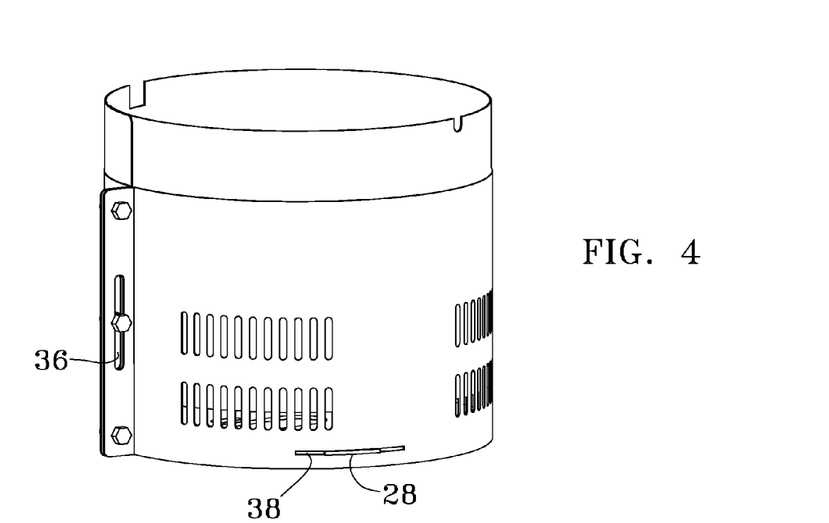
FIG. 4 is a third perspective view of the guard and guard extension coupled together.
Figure 5:
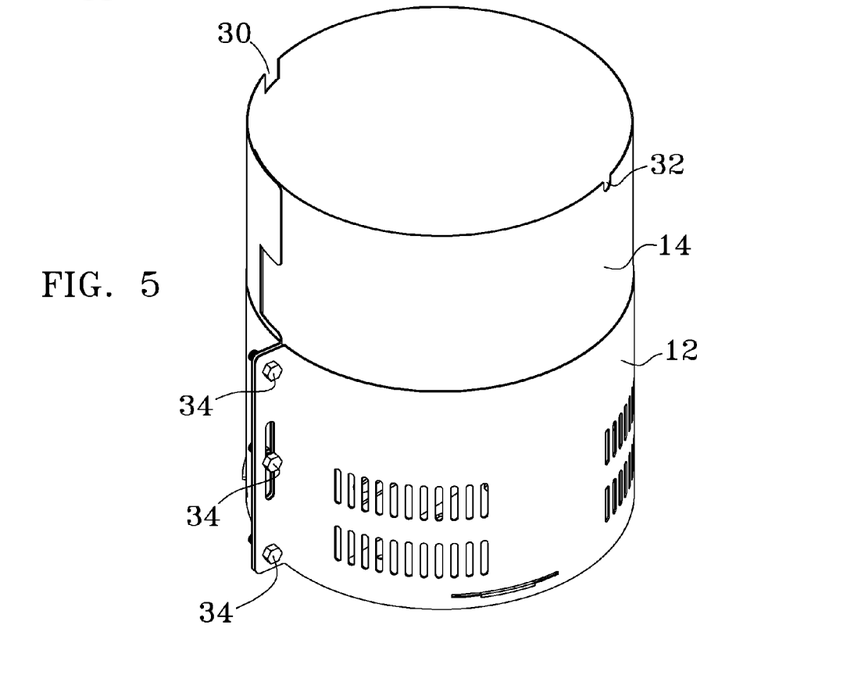
FIG. 5 is a perspective view of the guard with the guard extension in an extended position.
Figure 6:
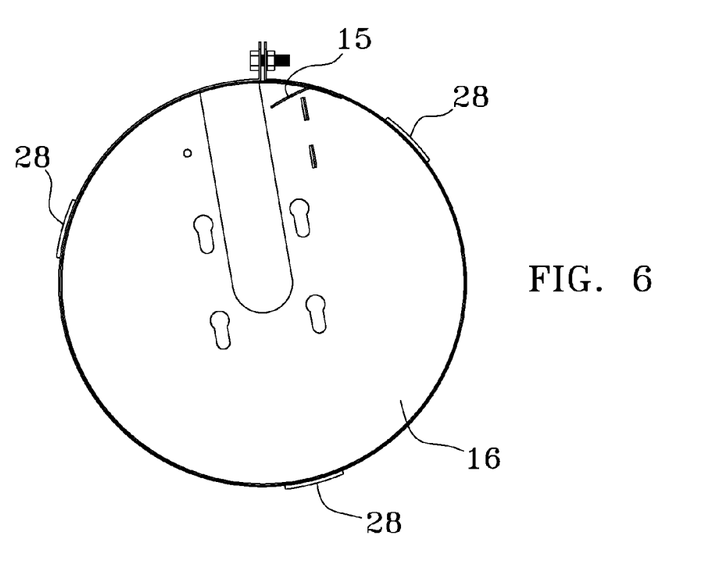
FIG. 6 is a top view of the guard and guard extension coupled together.
Figure 7:
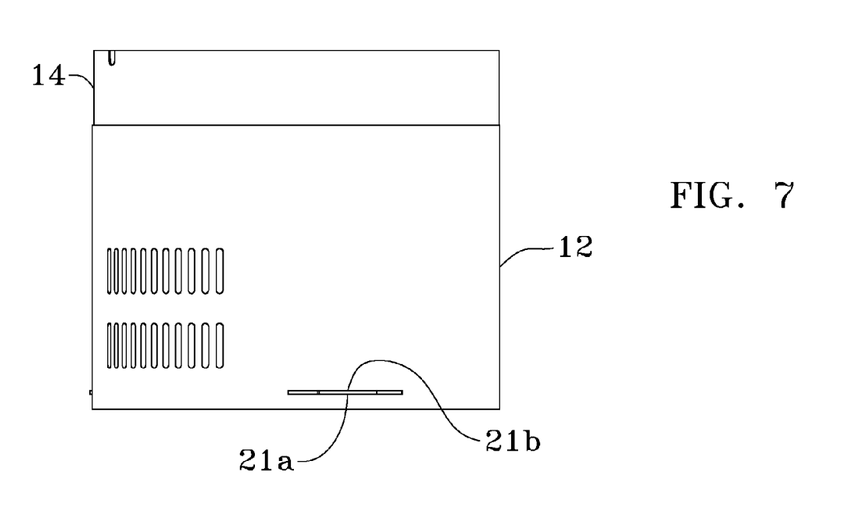
FIG. 7 is a front view of the guard and guard extension coupled together.
Figure 8:
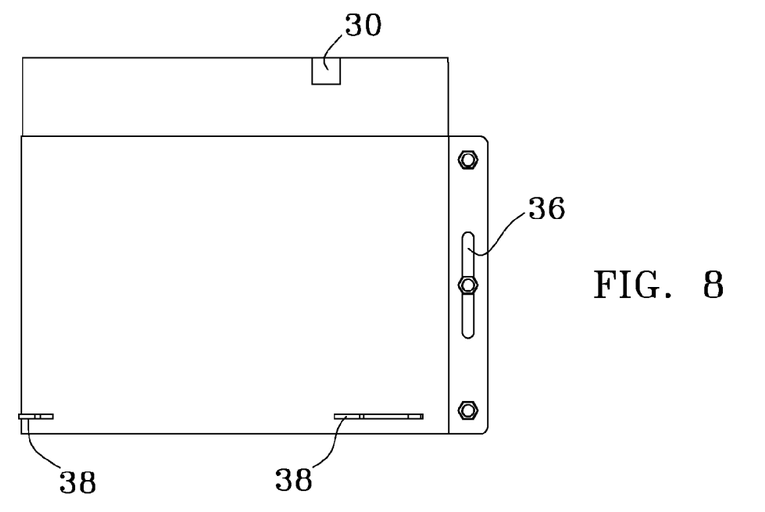
FIG. 8 is a right-side view of the guard and guard extension coupled together.
Figure 9:
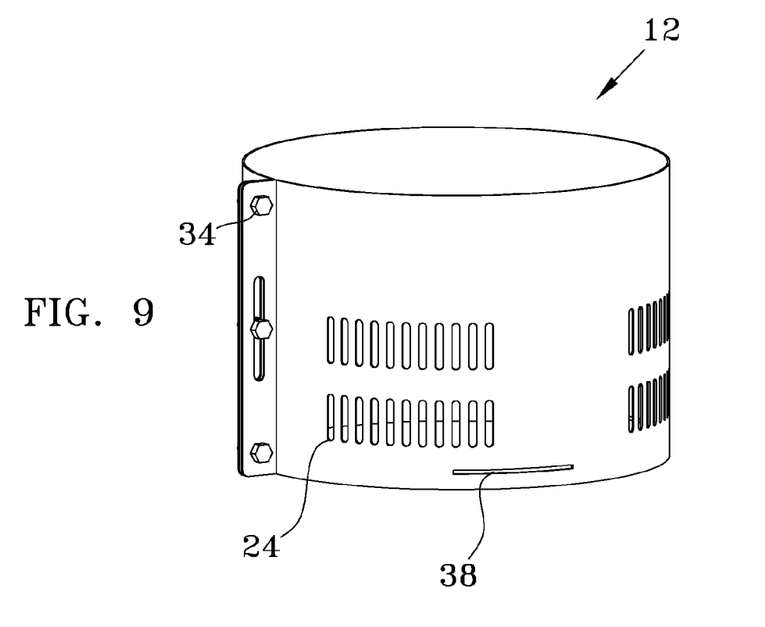
FIG. 9 is a perspective view of the guard.
Figures 10, 11, 12:
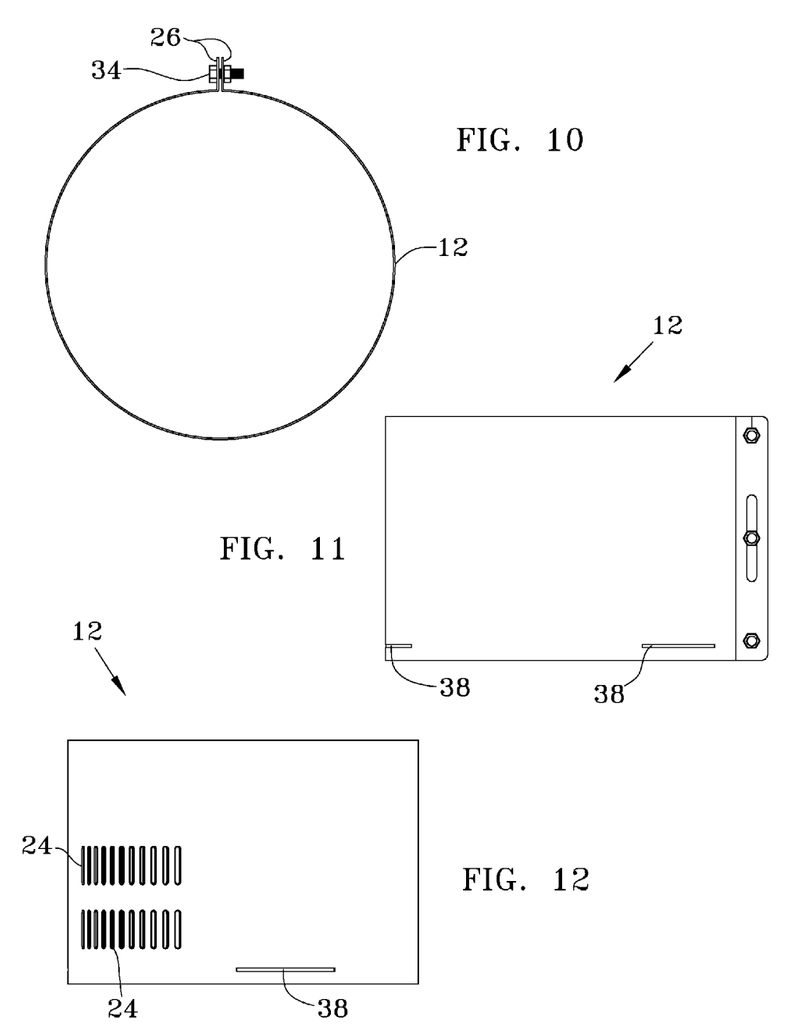
FIG. 10 is a top view of the guard.
FIG. 11 is a right-side view of the guard.
FIG. 12 is a front view of the guard.

Turning to FIGS. 2-12, it can be seen that adjustable guard 12 is a longitudinally split cylindrical housing with abutting flanges 26 extending normally therefrom the periphery of each of the split ends of the housing. It is the split housing design that both allows for the placement or removal of guard assembly 12 around a driveshaft, such that the driveshaft resides within the hollow center of guard 12 and also allows for the tightening of the adjustable guard 12 around the guard extension 14. Flanges 26 are mechanically secured together in the preferred embodiment by positionable nut/bolt combinations 34 as illustrated in FIGS. 2-6 and FIGS. 8-11. As is illustrated in FIG. 10, once flanges 26 are secured together they define the cylindrical housing. It is to be noted that the inner diameter of adjustable guard 12 is smaller than the outer diameter of the guard extension 14, which is partially housed within the adjustable guard 12 when these two units are assembled. Flange slot 36 allows the placement of the central nut/bolt combination 34 to vary along the longitudinal axis of the flanges 26. Two flange orifices 35 reside therethrough both ends of flanges 26 as illustrated in FIG. 2, allowing for three nut/bolt combinations 34 to mechanically secure abutting flanges together. Therefore, regardless of the amount the guard extension 14 that extends from the adjustable guard 12, the adjustable guard 12 will be able to be closed about its split with sufficient force to grip the guard extension 14 securely.

Numerous vent orifices 24 extend therethrough guard 12 allowing for both the venting of heat from the rotating driveshaft and also serving as visual inspection points for viewing of the now encased driveshaft and any associated coupling components.

Three mounting plate slots 38 are cut circumferentially into a first end of the guard 12, spaced approximately 120° apart at their midpoints 21 a, and are designed to capture and retain mounting plate 16 by the set of mounting plate tabs 28 that extend from the peripheral edge of mounting plate 16 and are inserted into the mounting plate slots 38 during assembly.

Figures 13, 14, 15, 16:
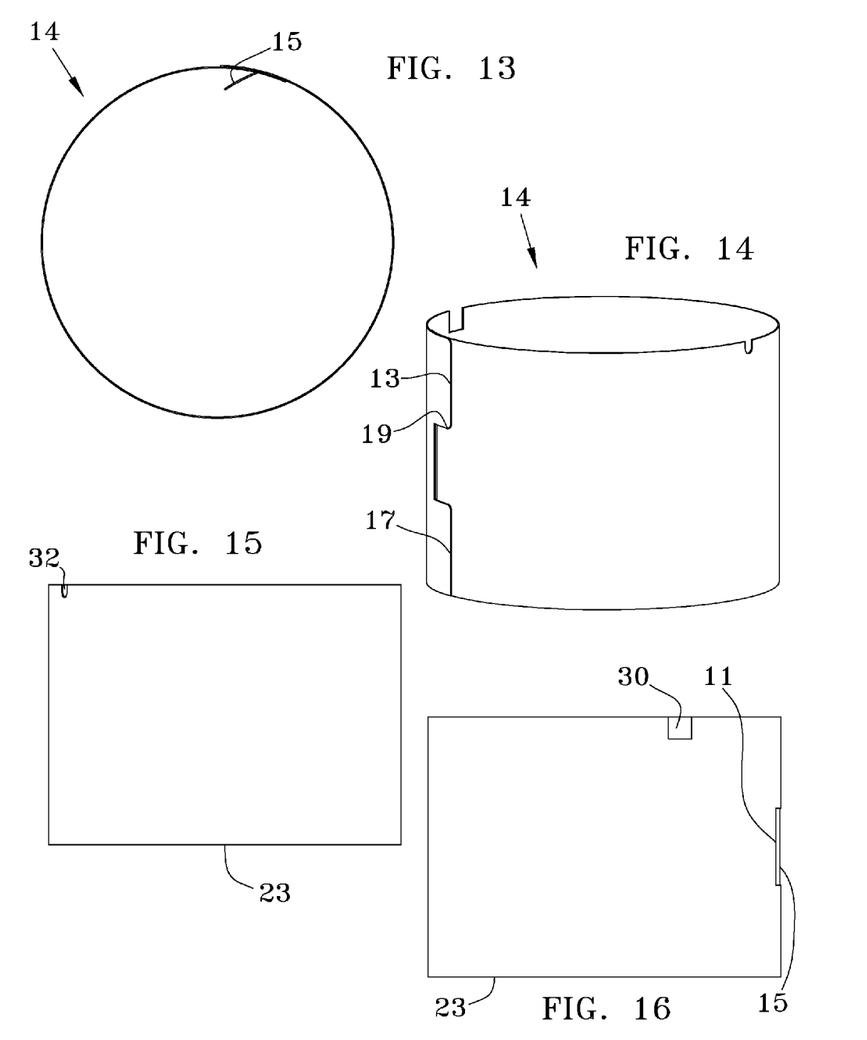
FIG. 13 is a top view of the guard extension.
FIG. 14 is a perspective view of the guard extension.
FIG. 15 is a right-side view of the guard extension.
FIG. 16 is a left-side view of the guard extension.

Guard extension 14 is illustrated in FIGS. 13-16. Guard extension 14 is a cylindrical body in its "in use" configuration. Guard extension 14 is made from a planar rectangular sheet 23 of steel or any suitable, durable material. At a first end of the rectangular, planar metal sheet 23 is formed a slot 11, which resides perpendicular to the longitudinal axis of the sheet 23, adjacent the peripheral edge of the first end of the guard extension 14, while the second end has two cuts 19 beginning at the edge of the second end and that lie approximately parallel to each other, separated by a distance smaller than the distance of the length of slot 11. These cuts 19 extend partway along the, parallel to the longitudinal axis of the sheet 23, such as to form three tabs, a first end tab 13, a middle tab 15, and second end tab 17. As the first and second ends of the rectangular, planar metal sheet 23 are brought together as to form the cylindrical body of the guard extension 14, middle tab 15 is inserted through slot 11 in the first end, (partially visible in FIGS. 13-14 and FIG. 16) such that middle tab 15 now resides within the cylindrical body of guard extension 14, contacting its inside surface as shown in FIG. 13, while first end tab 13 and second end tab 17 contact the outside surface of the cylindrical body of guard extension 14, as illustrated in FIG. 14. To "lock" or maintain the cylindrical body of guard extension 14, middle tab 15 may optionally be bent back onto itself after being inserted in slot 11, so as to prevent it from being withdrawn through the slot 11, thereby maintaining the assembled cylindrical configuration of the guard extension 14.

Guard extension 14 has two knockouts, a ground knockout 30 and Zerk fitting (or oil/grease lubrication access point) knockout 32. Ground knockout 30 is to accommodate the passing through of the shaft grounding brush on the drive side of the motor (not illustrated) and is generally square or rectangular in shape. Zerk knockout 32 is to accommodate insertion of a grease gun hose to lubricate a Zerk grease fitting and is generally parabolic in shape. Either of these knockouts may or may not need to be removed, depending on the specific design of the lubricating and grounding systems of the equipment involved.

In use, guard extension 14 and guard 12 are always used in conjunction with one another in a nested configuration as illustrated in FIG. 1-8 (wherein a portion of guard extension 14 resides within guard 12, while a portion of guard extension 14 resides outside of guard 12), so as to ensure complete access blockage of the area between the pump and the driving motor having the rotating equipment there between, as illustrated in FIG. 1. Without complete blockage, security is compromised.

Figures 17, 18, 19, 20:
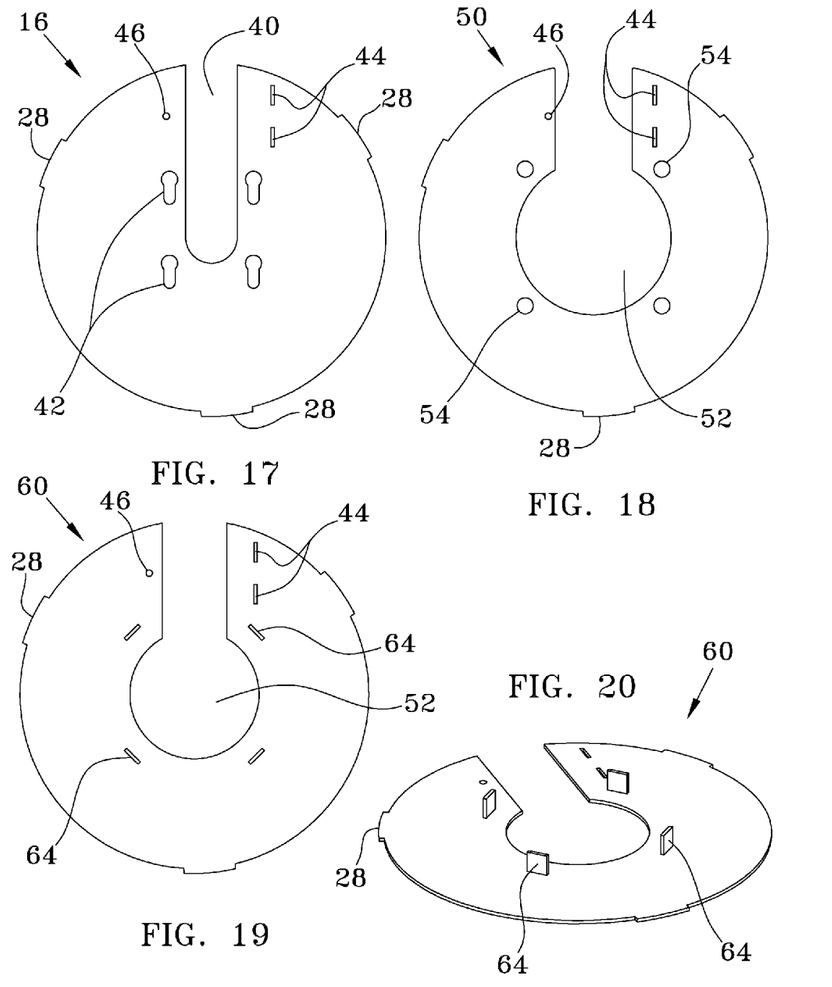
FIG. 17 is a front view of mounting plate.
FIG. 18 is a front view of a second mounting plate.
FIG. 19 is a front view of a third mounting plate.
FIG. 20 is a perspective view of the third mounting plate.

Turning to FIG. 17 mounting plate 16 is illustrated. Mounting plate 16 anchors the guard system 10 to the pump 22, holding the assembled system in place.

Figure 25:
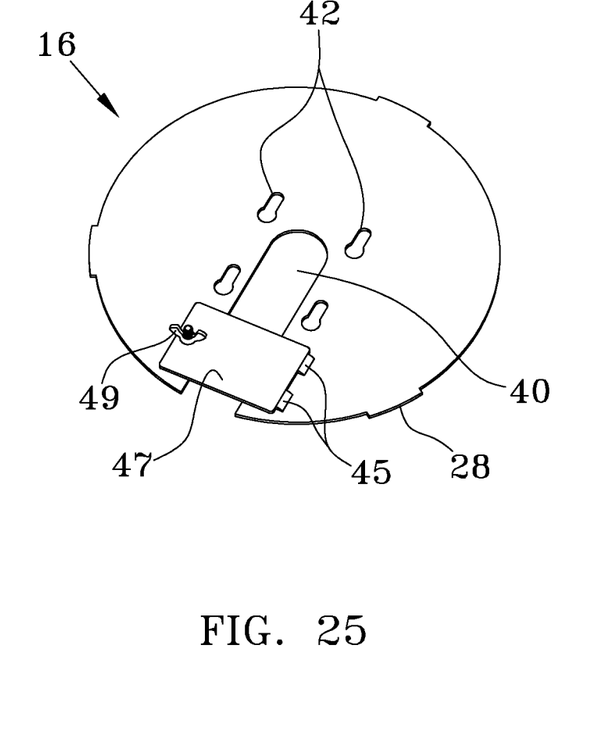
FIG. 25 is a perspective view of a first mounting plate with access door attached.

Tabs 28 extend from the peripheral edge of mounting plate 16, and are spaced approximately 120° apart at their midpoints 21b and are designed for mating engagement with mounting plate slots 38. Extending from mounting plate 16's approximate center point to the outside edge is a large positioning slot 40. Positioning slot 40 allows mounting plate 16 to slide over the driveshaft, such that the driveshaft will reside perpendicular to the plane of mounting plate 16, and be contained within the hollow center of guard assembly 10. Four fastener slots 42 are oblong with one end being larger in diameter than the other end, in a keyhole shape. Two fastener slots 42 reside on each side of positioning slot 40 in a pattern matingly configured for sliding engagement with the bolts of the pump housing (not illustrated). To accomplish this, the width of the narrow end of slots 42 is narrower than the width of the head of the pump bolt for which it fits, allowing the bolts on the pump housing to be loosened rather than removed for receipt of mounting plate 16 between them and the pump housing. Finally, mounting plate 16 is designed to accommodate a hinged viewing door 47, as is illustrated in FIG. 25. Door 47 is secured to mounting plate 16 via angled door tabs 45, which slide into door slots 44. Door 47 can then be closed and locked onto mounting plate 16 via wing nut 49, which passes through door orifice 46.

Second mounting plate 50 is illustrated in FIG. 18, still employing the same mounting plate tabs 28, door slots 44 and door orifice 46 as mounting plate 16. However, circular center cutout 52 extends to the perimeter of second mounting plate 50 with a reduced width from the diameter of the center cutout 52 forming a keyhole shaped cutout, and resulting in the C-shaped appearance of second mounting plate 50. Four circular connection orifices 54 extend therethrough second mounting plate 50, two on each side of center cutout 52 for mating engagement with bolts on the pump housing. (In this configuration the pump bolts will have to be removed fully to install the plate.) Center cutout 52 allows second mounting plate 50 to slide over the driveshaft, such that the driveshaft will reside within hollow center of guard assembly 10 and reside perpendicular to the plane of the second mounting plate 50.

Third mounting plate 60 is illustrated in FIGS. 19-20. Third mounting plate 60 is similar in design to mounting plate 16 and second mounting plate 50, comprising the same mounting plate tabs 28, door slots 44, door orifice 46, and in similar fashion to second mounting plate 50, third mounting plate 60 also employs a circular center cutout 52 extending to the perimeter of third mounting plate 60 with a reduced width from the diameter of the center cutout 52 forming a keyhole shaped cutout, and resulting in the C-shaped appearance of third mounting plate 60. For connection to the pump housing, third mounting plate employs four clamp tabs 64, two clamp tabs 64 located on each side of center cutout 52. In order to secure third mounting plate 60 to the pump housing, an adjustable gear clamp goes around flexible clamp tabs 64 and is tightened, contacting flexible clamp tabs 64 and drawing them into frictional engagement with the outside of the pump casing. Again, center cutout 52 allows third mounting plate 60 to slide over the driveshaft, such that the driveshaft will reside within hollow center of guard assembly 10 and reside perpendicular to the plane of the third mounting plate 60.

Figures 21, 22:
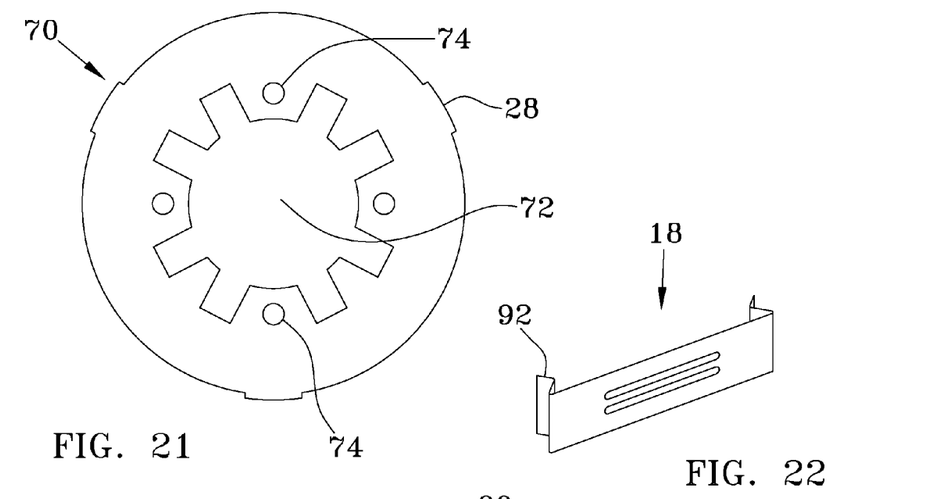
FIG. 21 is a front view of a fourth mounting plate.
FIG. 22 is a perspective view of a first flexible finger guard.

FIG. 21 illustrates fourth mounting plate 70. Fourth mounting plate also employs tabs 28 for mating engagement with slots 38 on guard 12. Additionally, it has a star-shaped cutout 72. Star-shaped cutout 72, can generally be described as having the shape of an eight-point star, wherein the "points" do not taper to a point, but instead extend in a rectangular design. Four pump orifices 74 are positioned 90° apart from one another from their midpoints, around star-shaped cutout 72. While star-shaped cutout 72 is designed to slide around driveshaft, it cannot be installed on the pump housing without first removing the driveshaft. This design is sized for specific manufacturer's pumps so as to have the precise bolt pattern and spacing. The points of the star-shaped cutout 72 allow for the plate 70 to reside approximately vertical on the pump casing, allowing non-planar protuberances to extend therein.

Looking at FIGS. 2-3 it can be seen that mounting plate slots 38 are approximately twice as long as mounting plate tabs 28. This configuration (2 to 1 ratio of slot length 38 to tab length 28) allows a mounting plate 16, 50, 60, or 70 to accommodate a plethora of guard 12/guard extensions 14. Guard extension 14 can increase in diameter up to two inches without the diameter of mounting plate 16, 50, 60, or 70 having to increase, easing the manufacturing process. Increasing the diameter of guard extension 14 will result in a larger gap between abutting flanges 26 when they are mechanically secured together, such as with nut/bolt combinations 34; however, the integrity of guard assembly 10 is maintained as long as abutting flanges 26 are positioned to face the base plate on which the pump and motor reside.

Figure 23:
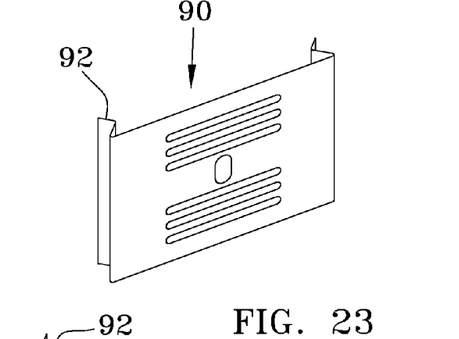
FIG. 23 is a perspective view of a second flexible finger guard.
Figure 24:
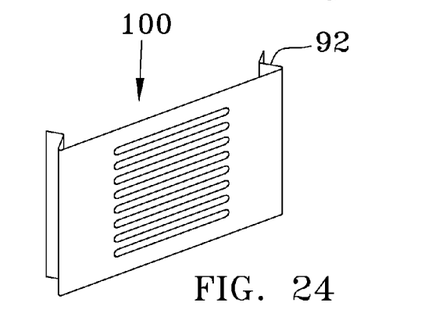
FIG. 24 is a perspective view of a third flexible finger guard.

FIGS. 22-24 illustrate first vented flexible finger guard 18, second vented flexible finger guard 90, and third vented flexible finger guard 100, respectively. Flexible finger guards 18, 90, and 100 are formed with a z-shaped compression flange 92 at either end thereof, and are placed into matingly conformed recesses about the pump housing. As illustrated in FIGS. 22-24 flexible finger guards can vary in size, depending on the pump housing recess, which requires obstruction. Made from a flexible metal, flexible finger guards, 18, 90, and 100 will simply deform slightly when pressure is applied to both z-shaped compression flanges 92, and will lock (friction fit) into the conformed recess when the pressure is released.

To install and adjust the guard assembly 10 the mounting plate 16, 50, or 60 is placed over the driveshaft of the motor via positioning slot 40, center cutout 52, or in the case of third mounting plate 70, the drive shaft must be removed. The pump end cap bolts (not illustrated) located on the pump housing are slightly unscrewed such that the wide end of fastener slots 42 may be slid over the bolts until the mounting plate 16 contacts the end cap of the pump 22 and then the mounting plate 16 is slid downward to lock the narrow end of the fastener slots 42 behind the bolts. The bolts are then tightened. For second mounting plate 50 the bolts on the pump end cap must be removed an then inserted through connection orifices 54, and for the third mounting plate 60 a gear clamp is placed around flexible clamp tabs 64 and tightened until tabs 64 are frictionally engaged with the pump casing. For fourth mounting plate 70, the driveshaft must be removed before the bolts on the pump end cap can be removed and then inserted through pump orifices 74 and tightened. Next, guard extension 14 in its planar configuration is slid under the rotating components, which couple the pump 22 to the motor 20. It is then curved around so that the middle tab 15 engages slot 11 and guard extension 22 is now in its cylindrical form. At this time the middle tab 15 may or may not be bent back on itself to lock guard extension 14 in its cylindrical configuration. Next, guard 12 is opened by separating flanges 26 with enough clearance to get over the pump/motor physical connections, (the rotating components) the guard extension 14, and the outer diameter of any of the mounting plates 16, 50, 60 or 70. Guard 12 is rotated such that the flanges 26 are at an accessible point for maintenance workers. The mounting plate tabs 28 in the mounting plate 16, 50, 60, 70 are aligned and inserted into the mounting plate slots 38 in the first end of guard 12. Nut/bolt combinations 34 are now placed through the flanges 26 and the center nut/bolt combination is slid to a location that allows adequate closing force to be exerted on the assembly. Guard extension 14 is slid outward from inside the guard until it abuts the end of the motor 20. Depending on the design of the pump, the Zerk fitting knockout 32 and/or ground knockout 30 may have to be removed prior to this step, to allow guard extension 14 to completely abut the motor. Nut/bolt combinations 34 are then tightened to secure the flange 26 around the guard extension 14. Since the guard 12 is slightly smaller in diameter than the guard extension 14, the nut/bolt combinations 34 will not be able to draw the flanges 26 together and they will reside slightly apart and approximately parallel when the bolt/nut combinations are tightened. Door 47 is installed on mounting plate 16, 50, or 60, wherein the angled door tabs 45 are inserted into the door slots 44, and wing nut assembly 49 is inserted through door orifice 46, allowing the drive shaft to be viewed and minor maintenance to be accomplished without removing guard assembly 10. Finally, flexible finger guards 18, 90, and/or 100 are inserted in appropriately sized recesses on the pump and or pump housing accordingly.

I claim:

1. A guard assembly comprising:
  a longitudinally split cylindrical guard housing having a first end and a second end, and having abutting flanges extending normally therefrom the periphery of each of the split ends of the housing, and wherein three mounting plate slots are cut circumferentially around said first end;
  a cylindrical guard extension frictionally housed within said housing;
  a circular, planar mounting plate with three mounting plate tabs extending from a peripheral edge thereof for engagement with said three mounting plate slots in said cylindrical guard housing;
  wherein said cylindrical guard housing has an inner diameter, and said cylindrical guard extension has an outer diameter, said inner diameter being dimensionally less than said outer diameter such that when said cylindrical housing is placed over said cylindrical guard extension there is frictional engagement between them;
  wherein said mounting plate slots are spaced approximately 120° apart at their midpoints around said first end of said guard housing and said mounting plate tabs are spaced approximately 120° apart at their midpoints from said peripheral edge of said mounting plate;
  wherein said cylindrical guard housing further comprises vent orifices extending therethrough
  wherein said abutting flanges of said cylindrical guard housing comprise a flange slot and a least one flange orifice to allow said abutting flanges to be mechanically fastened together;
  wherein said cylindrical guard extension is made from a planar, rectangular sheet of steel with a first end and a second end;
  wherein a slot resides perpendicular to the longitudinal axis of said sheet of steel and adjacent a peripheral edge of said guard extension; and
  wherein said second end has two cuts beginning at the edge said second end, said cuts residing approximately parallel to each other, separated by a distance smaller than the length of said slot residing at said first end, and forming a first end tab, a middle tab, and a second end tab such that when said first and second ends of the rectangular, planar metal sheet are brought together as to form a cylindrical body, said middle tab is inserted through said slot such that said middle tab resides within said cylindrical body of said cylindrical guard extension.

2. The guard assembly of claim 1 wherein said middle tab has been bent back onto itself after being inserted into said slot, so as to prevent said middle tab from being withdrawn through said slot, thereby maintaining the assembled cylindrical configuration of said cylindrical guard extension.

3. The guard assembly of claim 2 wherein said cylindrical guard extension further comprises a ground knockout.

4. The guard assembly of claim 2 wherein said cylindrical guard extension further comprises a grease fitting knockout.

5. A guard assembly comprising:
  a longitudinally split cylindrical guard housing having a first end and a second end, and having abutting flanges extending normally therefrom the periphery of each of the split ends of the housing, and wherein three mounting plate slots are cut circumferentially around said first end and are spaced approximately 120° apart at their midpoints;

a cylindrical guard extension frictionally housed within said housing; said cylindrical guard housing having an inner diameter, and said cylindrical guard extension having an outer diameter, said inner diameter being dimensionally less than said outer diameter such that when said cylindrical housing is placed over said cylindrical guard extension there is frictional engagement between them;

a circular, planar mounting plate with three mounting plate tabs spaced approximately 120° apart at their midpoints extending from a peripheral edge thereof for engagement with said three mounting plate slots in said cylindrical guard housing; and at least one flexible metal finger guard comprising z-shaped compression flanges an residing adjacent to said mounting plate.

\* \* \* \* \*